CONTROL ARRANGEMENT FOR DIRECTIONALIZING AUDIO TRANSMISSION

Filed Aug. 11, 1971 2 Sheets-Sheet 2

United States Patent Office 3,714,380

Patented Jan. 30, 1973

3,714,380

CONTROL ARRANGEMENT FOR DIRECTIONALIZING AUDIO TRANSMISSION

Robert Dean Berryman, Boulder, Colo., Donald Henry Erickson, Glen Rock, N.J., and Julio Cesar Raphel, Boulder, Colo.; said Erickson assignor to American Telephone and Telegraph Company, New York, N.Y., and said Berryman and said Raphel assignors to Bell Telephone Laboratories, Incorporated, Murray Hill, N.J.

Filed Aug. 11, 1971, Ser. No. 170,889
Int. Cl. H04m 7/14
U.S. Cl. 179—18 AH 9 Claims

ABSTRACT OF THE DISCLOSURE

An interface unit for coupling a central office to a branch exchange is disclosed. The unit includes a transmission control device responsive to call conditions for establishing either unidirectional or bidirectional transmission therethrough.

This invention concerns communication systems and in particular arrangements for interconnecting a central office trunk to a privately owned automatic branch exchange.

A branch exchange is a relatively small switching system tailored to the call traffic requirements of a single customer. It can be an economical as well as an efficient method of establishing calls between a limited number of stations. Calls to and from non-exchange stations are served customarily over dedicated trunks which connect the exchange to a local central office.

Many branch exchanges are equipped with direct-inward-dialing facilities eliminating the need for exchange operators to complete the bulk of incoming calls. Notwithstanding the manifest advantages of such facilities, a problem can arise where the exchange is privately owned since directly dialed calls to exchanges are not charged when the call is established to the exchange. The billing entry is actually made at the serving central office when an indication is received that the called station at the exchange has answered. Since the answer indication originates in the exchange, there exists a possibility that completed calls will not be billed because the answer signal is inadvertently or fradulently withheld.

Supervisory circuits conventionally used for detecting station loop closures can not be used in these situations because they rely on a metallic (D.C. path) connection to the station in order to sense loop closures. This is because a D.C. isolation network, e.g., transformer, is customarily required in the transmission path as part of exchange equipment or as part of interface circuitry to assure D.C. isolation between the customer provided equipment and the telephone system plant; this interrupts the metallic path preventing loop detection in this manner. In addition the cost of furnishing sophisticated circuitry for sensing a loop closure, using for example frequency signaling, has proven to be prohibitive.

Accordingly, it is an object of our invention to insure the correct billing of direct inward dialed calls established through privately owned branch exchanges and to prevent the fradulent use of switching facilities.

SUMMARY OF THE INVENTION

These and other objects of the invention are attained in accordance with an exemplary embodiment thereof in which special switching apparatus is interposed in a trunk path connecting the central office with a privately owned exchange to directionalize audio transmission thereover. The apparatus directionalizes an established transmission path so that a call originator hears only call progress signals, e.g., busy tone, etc., sent by the exchange equipment but is prevented from communicating over the established path with a called exchange station until that station answers and the answer signal is received at the office. Upon detection of such an answer signal sufficient to initiate a billing record of the call, bidirectional transmission over the trunk is enabled.

In the illustrative embodiment, an amplifier circuit is connected in series with one of the two wires which make up the trunk transmission path. The amplifier circuit is oriented so that A.C. signals emanating at the exchange are coupled via this one wire of the trunk transmission path and a D.C. isolation coupling transformer to the central office. The remaining wire of the trunk transmission path is connected to ground via an A.C. coupling device, e.g., capacitor. The amplifier also compensates for losses in the path due to the interposed apparatus.

Further, circuitry connected directly to the exchange responds to the receipt of an answer signal sent over a separate signaling path. Operation of this circuitry causes the amplifier inserted in the one wire of the trunk transmission path to be bypassed and also removes the ground coupling device from the other wire of the trunk transmission path. Accordingly, the exchange station is now directly connected over both wires of the trunk transmission path to the coupling transformer for bidirectional transmission.

Advantageously, this arrangement prevents bilateral call transmission prior to the receipt of an answer signal but it permits, at the same time, communication between a branch exchange and a calling station so that the call originator does not sense the transmission path impairment. The caller can, for example, hear line busy, trunk busy and other exchange originated signals.

Accordingly, it is a feature of this invention to furnish a device interposed in a trunk and controlled by call conditions to permit unidirectional transmission prior to a called station answering and bidirectional transmission after receipt of the called station answer.

DESCRIPTION OF THE DRAWING

The foregoing objects, features, and advantages, as well as others of the invention, will be more apparent from the following description of the drawing, in which.

Figure 1:
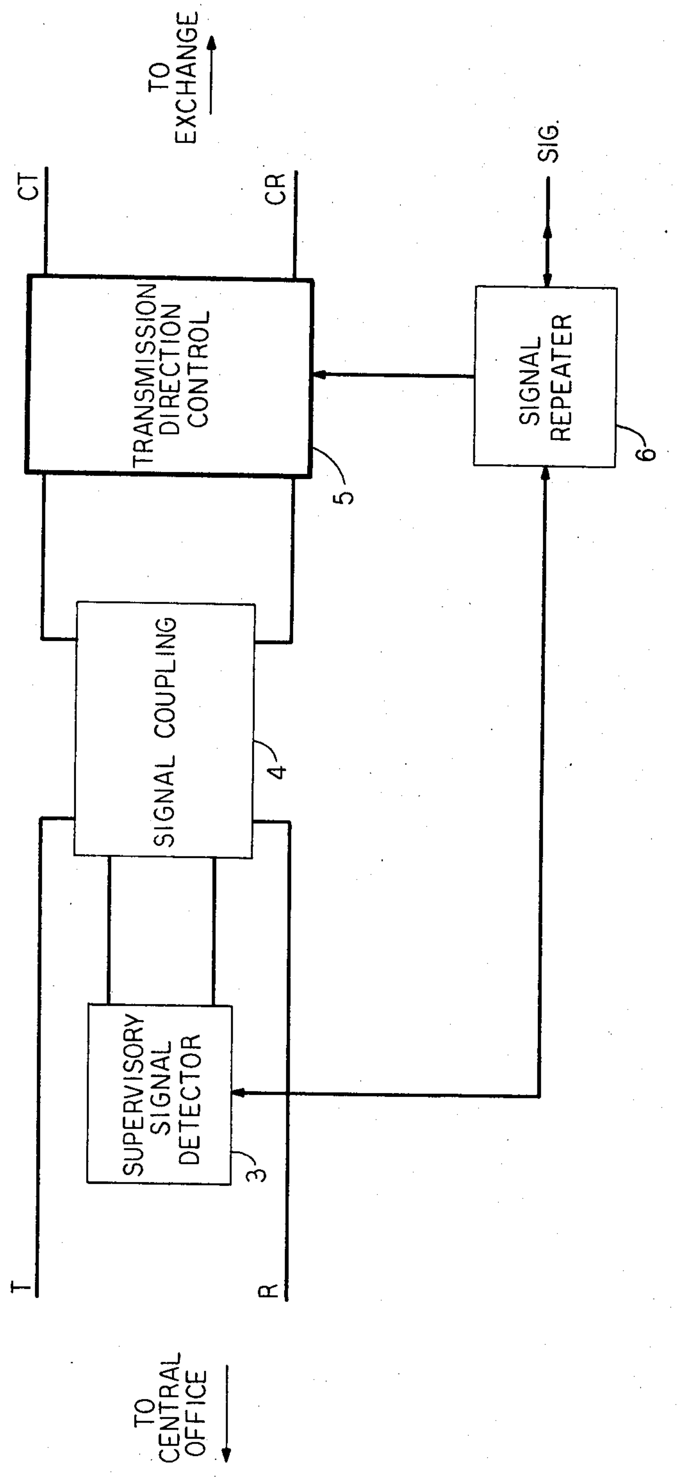
FIG. 1 shows in block diagram form the subcircuits of an exchange-to-central office interface unit in accordance with one embodiment of our invention.

The subcircuits of the interface unit are depicted in functional terms of FIG. 1 to assist in understanding our invention. Although the invention is primarily concerned with Transmission Direction Control 5 (shown in heavy outline) and the control circuitry associated therewith, a fuller understanding of this invention will be gained by first considering the various parts of the interface unit circuitry.

Figure 2:
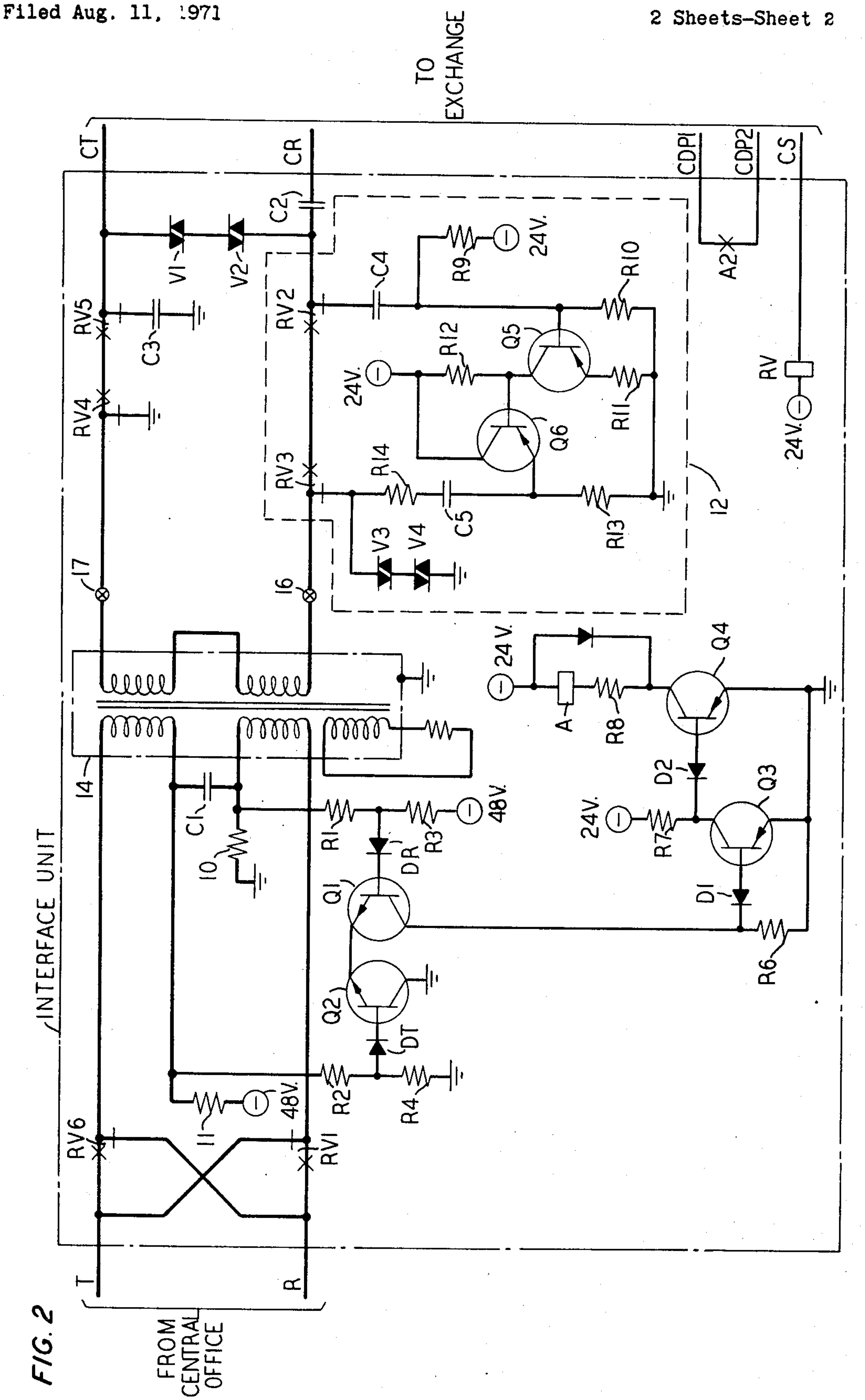
FIG. 2 depicts the circuit details of the interface unit of the embodiment of FIG. 1.

Broadly speaking, Supervisory Signal Detector 3 connects to the transmission path, leads T and R, via Signal Coupling 4 to monitor this path for supervisory signals (D.C. signal changes) sent by the call originator. Detector 3 is largely conventional and it senses the seizure of the unit for a call. It comprises as shown in FIG. 2 transistors Q1–Q4 and associated circuitry. Signal Coupling 4 isolates D.C. signals originating at the central office from exchange signals. It also serves to couple A.C. signals (audio) on the transmission path during bidirectional audio transmission and comprises transformer 14 shown in FIG. 2. Signal Repeater 6 conveys supervisory signals detected by Detector 3 to the exchange and also directs supervisory signals originating in the exchange to Transmission Direction Control 5. Control 5 includes relay RV and contact AZ as well as the associated wiring of FIG. 2. In response to these signals, Control 5 directionalizes the transmission over the path. Control 5 is interposed between Coupling 4 and the two wire communication path, leads CT and CR, which extends to the exchange. A more complete description of the function of Control 5 follows under the heading "Detailed Description." In general it embraces amplifier 12 and contacts of relay RV.

DETAILED DESCRIPTION

With reference now to FIG. 2, there is disclosed the essential circuit details of an interface unit for coupling a central office to a branch exchange and embodying our transmission path control arrangement. The ensuing description follows the progress of a call beignning at the point of origination and until bidirectional transmission over the trunk path is established.

Prior to the seizure of the interface unit on an incoming call, transistors Q1 and Q3 are turned on (saturated). A seizure is indicated by a low impedance bridge interconnecting leads T and R via central office equipment (not shown). This seizure signal turns on transistor Q2 and turns off transistor Q1, which causes transistors Q3 to turn off and transistor Q4 to turn on. As a result, relay A is energized via the emitter-collector circuit of transistor Q4.

Transistors Q1 and Q2 form a comparator circuit analogous in its operation in many respects to voltage comparator circuits described, for example, in the text entitled "Pulse Digital and Switching Waveforms" by Millman and Taub. See in particular the circuitry shown on page 257 of that text. In the subject circuit, resistors R1–R4, 10 and 11 are selected so that transistor Q1 is on and transistor Q2 is off when the transmission loop is open. When the loop is closed, current flows through resistors 10 and 11, changing the voltages at the base of transistors Q1 and Q2, causing transistor Q1 to turn off, and transistor Q2 to turn on. Accordingly, transistor Q3 turns off and —24 volts is connected through resistor R7 and diode D2 to the base-emitter junction of transistor Q4 to turn that transistor on and to operate relay A.

The seizure of the interface unit by the central office causes the transmission of a seizure signal indication to the exchange by the circuitry shown in the lower right-hand corner of FIG. 2. Leads CDP1 and CDP2, which connect to the exchange, are bridged by contact A2 to indicate the seizure of the interface unit.

The path from the central office (leads T and R) terminates on transformer 14 while the transmission path (leads CT and CR) form the exchange does not terminate on transformer T. Instead lead CT is terminated by a capacitor C3 which connects to ground via the break contact of transfer contact RV5. Lead CR terminates in transistor amplifier 12 which comprises transistors Q5 and Q6 and is of a substantially conventional design. The path for connecting lead CR to the input of amplifier 12 may be traced via capacitor C2 and the break contact of transfer contact RV2. Signals originating in the exchange are coupled via amplifier 12 to the lower winding (terminal 16) of transformer 14. The upper winding of transformer 14 (terminal 17) connects to ground via a break contact of transfer contact RV4 to complete the signal coupling path.

Advantageously, the interface unit in accordance with our invention may be utilized for direct inward dialing from a calling customer at a central office to a dialed extension on the customer provided branch exchange. The dial pulses are received from the central office over the tip and ring leads T, R and are detected by the transistors Q1, Q2 thereby causing operation of the relay A, as described above for the initial seizure of the interface unit. The pulses are repeated to the customer provided branch exchange over leads CDP1 and CDP2 by the make contact A2 as the A relay follows the dial pulses. Advantageously relay A is a fast mercury relay connected so as to follow the dial pulses accurately.

When the exchange station answers the call, circuitry (not shown) of the exchange provides a ground signal which is coupled via lead CS shown at the lower right-hand corner of FIG. 2 for operating relay RV. In operating, relay RV at transfer contacts RV2 and RV3 effectively bypasses amplifier 12 and connects lead CR via capacitor C2 directly to the lower winding of transformer 14. Also, transfer contacts RV4 and RV5 couple lead CT directly to terminal 17 of transformer 14. This action establishes bidirectional transmission through the interface unit. Unless this signal is received, a bidirectional path is not established and thereby the improper use of the inter-office facility is prevented.

The polarity of the voltages on leads T and R are reversed when relay RV operates to send an answer signal to the central office where the billing entry is made. In particular, contacts RV1 and RV6 transpose the conductors to send a battery reversal signal to the central office.

Accordingly, normal bidirectional speech transmission between a calling party connected to the distant central office and a called party at the customer provided branch exchange cannot occur until after a reverse battery supervision signal has been sent back to the central office to assure proper charging or billing for the call. However, and in accordance with an aspect of our invention, the calling party can still hear the usual supervisory signals that may need be transmitted to him from the customer provided branch exchange during the period when the communication path is established only as a unidirectional and not a bidirectional path.

What is claimed is:

1. A transmission path control arrangement for two wire paths interconnecting a switching office to a branch exchange to prevent two-way voice communication thereover prior to the receipt of an answer signal from the exchange comprising, means effective when said path is idle for enabling unidirectional voice transmissions exclusively thereover, means effective when said path is seized by said office for coupling a seizure signal to said exchange to indicate a calling condition, and means controlled upon the receipt of a signal from said exchange indicating an answering condition for establishing bidirectional voice communication on said transmission path.

2. The invention set forth in claim 1 wherein said enabling means includes an amplifier circuit interposed in said transmission path and being oriented so that an input terminal thereof receives signals from said exchange and an output terminal thereof forwards signals to said office.

3. The invention set forth in claim 2 wherein said amplifier circuit is interposed in one of the two wires comprising said transmission path, and means for connecting said other wire to A.C. ground.

4. The invention set forth in claim 3 wherein said establishing means includes means for connecting said input and said output terminals of said amplifier together, means for disconnecting said A.C. ground from said other wire, and means for connecting said other wire to said path to form a bidirectional transmission path.

5. A control arrangement interposed in a transmission path between a first and a second switching office for converting the path from unidirectional transmission to bidirectional transmission upon the establishment of a connection to a called station, comprising a unidirectional transmission device oriented during the idle state of said path so as to couple transmission signals originating in said first office to said second office only over said path, means for monitoring for an answer signal from said first office indicating the off-hook status of a called station connected to said path, means controlled by said monitoring means upon detecting the receipt of an answer signal for disconnecting said unidirectional transmission device from said path, and means controlled by said monitoring means for establishing bidirectional transmission on said path between said second office and said called station.

6. The invention recited in claim 5 wherein said transmission device comprises a transistor amplifier stage for coupling signals originating in said first office to said second office and for inhibiting signal transmission in the opposite direction.

7. A trunk circuit arrangement for connecting directly dialed calls originating in a central office to a private branch exchange over a dedicated two-wire interoffice path including, means connected to said path for sensing a low impedance connection applied at said office between said wires of said path, separate signaling paths connecting to said exchange, means responsive to said sensing means for forwarding a seizure signal to said exchange via said signaling paths, means connected to said signaling paths for monitoring for a call completion signal sent by said exchange and indicating a connection of an exchange station to said interoffice path, and wherein the improvement comprises, means interposed in said interoffice path normally operative to couple transmission signals emanating at said exchange to said office and to inhibit coupling such signals emanating at said office to said exchange, said coupling means being a transistor amplifier circuit having an input connected toward said exchange and an output connected toward said office, and means controlled by said monitoring means for bypassing said amplifier circuit in order to permit bidirectional transmission of transmission signals over said interoffice path.

8. An interface unit for connection between a first transmission path from a central office and a two wire trunk transmission path to a branch exchange, said unit comprising unidirectional transmission means having an input and an output, an isolating transformer having at least a first and a second winding, a capacitor, means normally connecting said unidirectional transmission means input to one wire of said trunk transmission path, said unidirectional transmission means output to one end of a first winding of said transformer, said other end of said first winding to ground, and said second wire of said trunk transmission path through said capacitor to ground, and means adapted to be connected to a separate signaling channel extended from said exchange and being responsive to signals thereover for bypassing said unidirectional transmission means to connect said one wire to said one end of said first winding and for directly connecting said second wire to said second end of said first winding.

9. An interface unit in accordance with claim 8 wherein said unidirectional transmission means comprises an amplifier.

References Cited

UNITED STATES PATENTS 3,179,750 4/1965 Reilly .......... 179—27 C A

THOMAS W. BROWN, Primary Examiner

U.S. Cl. X.R.

179—18 AD